United States Patent [19]

Schulz et al.

[11] 4,015,061
[45] Mar. 29, 1977

[54] PROTECTED AMINO-FUNCTIONAL INITIATORS AND AMINO-TERMINATED POLYMERS AND THEIR PRODUCTION

[75] Inventors: Donald Norman Schulz, Hartville; Adel Farhan Halasa, Bath, both of Ohio

[73] Assignee: The Firestone Tire & Rubber Company, Akron, OhioH

[22] Filed: Aug. 22, 1975

[21] Appl. No.: 606,801

Related U.S. Application Data

[63] Continuation-in-part of Ser. No. 550,237, Feb. 14, 1975, abandoned, which is a continuation of Ser. No. 442,695, Feb. 15, 1974, abandoned.

[52] U.S. Cl. .................................. 526/178; 526/29; 526/54; 526/56
[51] Int. Cl.[2] ...................... C08F 4/48; C08F 8/12; C08F 12/08; C08F 36/14
[58] Field of Search ........... 260/94.6, 94.2 M, 82.1, 260/84.7, 94.7 A, 85.1; 450/684; 526/178, 29, 54, 56

[56] References Cited

UNITED STATES PATENTS 3,300,465  1/1967  Bayer ........................... 260/94.6 X

OTHER PUBLICATIONS

Rubber Chemistry Technology 42, 90; 1969, D. M. French.

Primary Examiner—William F. Hamrock

[57] ABSTRACT

N,N-bis(trialkylsilyl) amino-terminated polymers are prepared by treating p-lithio-N,N-bis(trialkylsilyl) aryl amine with a diene monomer and the resulting polymers are converted to a mono- or di- primary aryl amine-ended diene polymer directly by acid hydrolysis. The amine-ended polymers may be homopolymers of a conjugated diene which contain 4 to 8 carbon atoms or copolymers of such conjugated dienes or copolymers of such a conjugated diene and a vinyl monomer.

7 Claims, 2 Drawing Figures

PROTECTED AMINO-FUNCTIONAL INITIATORS AND AMINO-TERMINATED POLYMERS AND THEIR PRODUCTION

This application is a continuation-in-part of application Ser. No. 550,237 filed Feb. 14, 1975 which is a continuation of Application Ser. No. 442,695 filed Feb. 15, 1974, both of which have been abandoned.

BACKGROUND OF THE INVENTION

It is known that living polybutadienyllithium end groups will remove a hydrogen from a primary or secondary amine and thus terminate the polymerization. (D.M. French; Rubber Chemistry Technology 42, 90 — 1969.) Consequently, the formation of living polybutadiene in concert with primary or secondary (1° and 2°) amine functionally is prohibited. It has been shown that aniline substituted with N,N-trimethylsilyl groups is stable to organometallic reagents. (W. Broser, W. Harrer, Ang. Chem. I.E. 4, 1081 —1965.) According to this invention, polymers which are mono- or di-terminated with N,N-bis (trialkylsilyl) amino groups in which the alkyl group contains 1 to 8 carbon atoms, are prepared and are further converted to amino-terminated polymers.

N,N-bis (trialkylsilyl) amino- mono- and di- terminated polymers of the class consisting of (a) homopolymers of conjugated dienes containing 4 to 8 carbon atoms, (b) copolymers of such conjugated dienes and (c) copolymers of such a conjugated diene and a vinyl monomer, the alkyl groups of which contain 1 to 8 carbon atoms, are new as is the intermediate, $(SiR_3)_2N-Ar-P-Li$. Amino-terminated polybutadiene is mentioned on page 90 of D.M. French, supra. No disclosure of a compound of the formula $H_2N-Ar-P-H$, disclosed in the accompanying drawings, has been found in the art, and such compounds are claimed as new. In fact, a polymer derived from such a conjugated diene, with or without a vinyl monomer, with one or two or more $-NH_2$ terminal groups, of the generally more valuable commercial type, i.e. anionically produced, is new and claimed herein. Amine-terminated polybutadiene polymers are useful precursors to polybutadiene-Nylon 6 block copolymers which are useful as high-impact resins. The products of this invention are also useful intermediates for this purpose and for the preparation of polydiolefin-polyurea, polydiolefin-epoxy resins, and other applications of amine-terminated polymers known to those skilled in the art.

Polybutadiene-Nylon 6 block polymers are usually prepared through te intermediacy of isocyanate-terminated polymers. (W. L. Hergenrother, R. J. Ambrose, J. Polym. Sci. B, 10, 679; 1972.) The amine-terminated polymers such as those disclosed herein can also act as intermediates for polybutadiene-Nylon 6 di- and tri- block polymers. Furthermore, the amine polymers have stability and therefore can be stored and transported. This is an advantage over the isocyanate-terminated polymers. It is well known that amine groups are less sensitive to protic materials, such as moisture, alcohols, etc. than are isocyanate groups.

Amine-terminated polymers prepared according to Zelinski, Hseih and Stroble, U.S. Pat. No. 3,109,871, are terminally reactive but cannot be used in carrying out this invention because the end groups include an active hydroxyl, and the amine is tertiary in nature such as

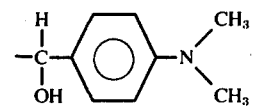

According to the present invention, primary-amine-terminated polymers are prepared from which the block copolymers may be produced.

FIG. 1 illustrates the procedure for producing the mono-amino-terminated polymers of this invention, and FIG. 2 outlines the procedure for making the di-amino-terminated polymers.

In the drawings and in the description which follows, the designation Compound I is used to identify the lithium initiator (found in the procedure outlined in both drawings), and the designations Polymer II to VI are used to identify different polymers found in the drawings.

SUMMARY OF THE INVENTION

Compound I is a p-lithio-N,N-bis (trialkylsilyl) substituted N-amino-aryl compound of the class consisting of phenyl, tolyl, xylyl and naphthyl, the alkyl group containing 1 to 8 carbon atoms, produced, as by reacting a halo-N-N-bis (trimethylsilyl) aniline with n-butyllithium. (Broser et al. Ang. Chem. I.E. 4 1081 — 1965.) Other amino-phenyl-substituted compounds may be produced using amino-aryls other than the aniline-substituted compounds such as the aminotoluenes, the aminoxylenes, aminonaphthalenes, etc. This polymerization initiator is of interest because the ring has been lithiated directly while the amino functionality has been masked by the silyl substituents. The litium is terminally introduced without lithiation of the amino group.

For the production of the silyl amine polymer (Polymer III), the lithium of Compound I is replaced with a monomer selected, at $-50°$ to $100°$ C., from the class consisting of (a) a conjugated diene of 4 to 8 carbon atoms, (b) a mixture of such conjugated dienes and (c) a mixture or copolymer of such a conjugated diene and a vinyl monomer. Thus, a N,N-bis (trialkylsilyl) substituted amino-aryl-mono-terminated homopolymer or copolymer (Polymer III) is readily produced. This procedure is outlined in FIG. 1. For the production of the di-N,N-bis (trialkylsilyl) substituted-amino-aryl-terminated polymer (Polymer V of FIG. 2), the lithium of the p-lithio-N,N-bis (trialkylsilyl) substituted-N-amino-aryl compound (Compound I) is reacted with monomer and $Cl_2SiR'_2$ in which R' is an alkyl group of 1 to 8 or more carbon atoms or aryl such as phenyl, etc. This process is illustrated in FIG. 2.

Polymers with more than two such terminal groups may be similarly produced.

The conjugated diene may be butadiene-1,3, isoprene, pentadiene, piperylene, chloroprene, hexadiene, octadiene, etc. The vinyl monomer may be styrene, alpha-methylstyrene, acrylonitrile, o-, p- and m-methylstyrene, etc.

The alkyl in the N-substituted trialkylsilyl groups may contain 1 to 5 or 8 or more carbon atoms, so the trialkylsilyl groups contain in addition to the commercially preferred trimethylsilyl and triethylsilyl, the tripropyl, tributyl, tripentyl, trihexyl (including tri-t-butyl-dimethyl), triheptyl and trioctyl silyl groups.

The lithio compound (Polymer II) can be coverted directly to the amino polymer (Polymer IV) by hydrolysis with a known dilute organic or mineral acid catalyst such as methane sulfonic acid, hydrochloric acid, p-toluene sulfonic acid, etc. at a temperature of −50 to 100° C., or it may be first hydrolyzed to the N,N-bis (trilakylsilyl) amino-terminated polymer (Polymer III) with a neutral (alcohol) catalyst such as methyl alcohol, ethyl alcohol, etc. at −50 to 100° C. and then to the hydrolyzed polymer (Polymer IV) by an acid hydrolysis catalyst such as hexane, benzene, diethyl ether, tetrahydrofuran, etc.

The processes which have been discussed follow the procedures outlined in FIGS. 1 and 2. Thus the lithiated polymer (Polymer II) is converted to the monosilyl amine polymer (Polymer III) or the di-silyl amine polymer (Polymer V). The silyl amine polymers (Polymers III and V) are subsequently converted by acid hydrolysis to amine polymers (Polymers IV and VI). The examples are only illustrative and illustrate the production of liquid and solid rubbers, and regardless of the monomer or mixture of monomers employed the polymer products may be of any molecular weight, e.g. substantially 6,000 to 250,000, either liquid or solid.

DESCRIPTION OF THE PREFERRED EMBODIMENTS

Figure 1:
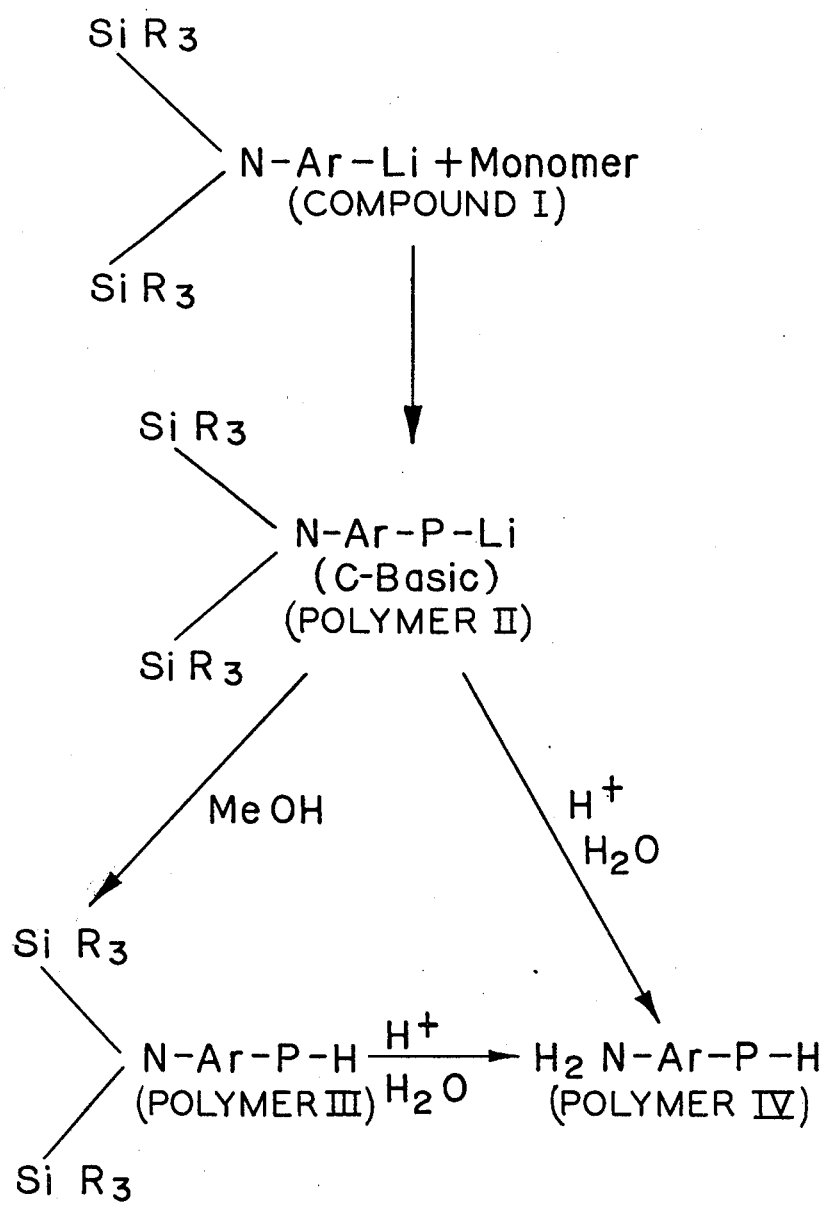
Figure 2:
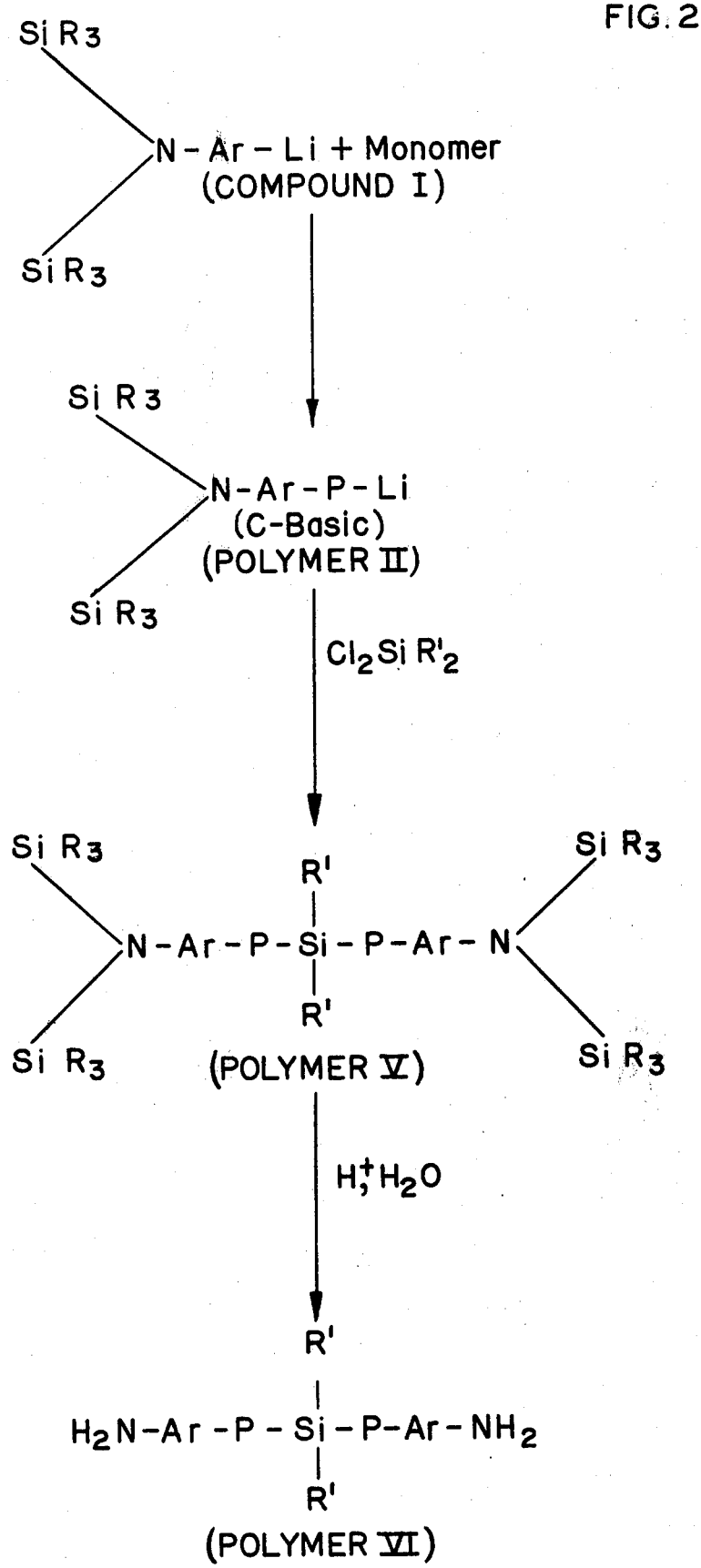

EXAMPLE 1 n-Butyllithium (0.128 1. : 1.5M) was added at −15° C. to p-bromo-N-N-bistrimethylsilyl aniline (61 g., 0.192 moles) (prepared according to Broser and Harrer, supra.) in 150 ml. diethyl ether. The mixture was allowed to warm to room temperature for ½ hour to complete the reaction and was stored at −15° C. until ready for use. The concentration of p-lithio-N-N-bistrimethylsilyl aniline initiator was found to be 0.190 M. as determined by the Gilman double titration method.

1,3-Butadiene was polymerized with the p-lithio-N-N-bistrimethylsilyl aniline initiator (Compound I) solution prepared as described above. The following is a typical recipe:

| | |
|---|---|
| 1,3-butadiene, parts by weight | 250 |
| Hexane (diluent), parts by weight | 1,000 |
| Initiator, molarity | 0.19 |
| Polymerization temperature | 30° C. |

Polymerizations were continued until complete conversion was achieved, as evidenced by the total solids level. The polymers were recovered by treating with methanol at substantially 25° C and removing the diluent.

The isolated lithium-free p-N,N-bis (trimethylsilyl) amino-phenyl-terminated polybutadiene polymer (Polymer III) was characterized by infrared (IR) and nuclear magnetic (NMR) spectrometry and gel permeation chromatography (GPC). The presence of the p-N,N′-bistrimethylsilylaminophenyl groups was established by infrared absorptions at 1250 cm$^{-1}$ (TMS-trimethylsilyl), 840 cm$^{-1}$ (TMS), 750 cm$^{-1}$ (TMS) and 810 cm$^{-1}$ (p-disubstituted phenyl). The polybutadiene microstructure as determined by infrared analysis showed 16.4% cis 1,4; 44.0% trans 1,4; 39.6% 1,2; and a total found unsaturation level of 95.7%. The NMR showed TMS resonance at 0.1 ppm (delta). GPC analysis showed that the molecular weight (Mn) of the polymer was found to be 6054 and the molecular weight distribution (Mw/Mn) was found to be 1.48.

Since the p-N,N-bis (trimethylsilyl) amino phenyl-group does not react with lithium initiators, even "live" lithium polymers, good molecular weight control for polymerization with p-lithio-N,N-bistrimethylsilyl aniline (Compound I) initiators is possible. In other words, the molecular weight can be varied by simply varying the monomer and catalyst charges. Table I shows good correspondence between theoretical molecular weights (based upon monomer and catalyst charges) and molecular weights (GPC) of polymers prepared by the process described.

TABLE I

| Butadiene gms | Catalyst mm | Polymerization Temperature | $\overline{M}_n$ (theory)[a] | $\overline{M}_n$ (GPC) |
|---|---|---|---|---|
| 43.3 | 0.152 | 50° C. | 284,000 | 210,970 |
| 43.3 | 1.76 | 30° C. | 24,600 | 23,078 |
| 43.3 | 0.88 | 30° C. | 49,200 | 46,571 |

[a] - Theoretical molecular weight based upon monomer and catalyst charges.

The vinyl content of polymer (Polymer IV) in Example I should be considered as illustrative rather than limiting. Other vinyl contents are possible by simply varying the amount of ether present (T. A. Antkowiat et al., J. Polym. Sci. A-1, 10, 1319 (1972) ).

EXAMPLE II

The p-N-N-bis (trimethylsilyl) amino-phenyl-terminated polybutadiene (Polymer III) prepared according to Example I was dissolved in 200 ml. hexane and mixed with 50 ml. of 2N HCl (aq.). The batch was refluxed for 2 hours. After the reaction period, the batch was cooled to 25° C. The acidic water layer (including any nonpolymeric material) was discarded. The hexane layer was neutralized with $K_2CO_3$, concentrated on a Rotovac and dried in vacuum (60° C.).

The infrared spectrum of the polymeric product (Polymer IV) showed —$NH_2$ absorption (3300–3500 cm$^{-1}$), p-di-substituted phenyl absorption (810 cm$^{-1}$) and the absence of

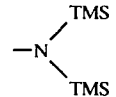

signals at 1250 cm$^{-1}$, 840 cm$^{-1}$, and 750 cm$^{-1}$. Infrared analysis also showed that the polybutadiene segment of the polymer contained 22.2% cis 1,4, 40.8% trans 1,4, and 37.0% 1,2, with a total found unsaturation level of 92.5%. Gel permeation chromatographic data showed the molecular weight (Mn) of the polymer to be 7234 and the molecular weight distribution (Mw/Mn) to be 1.43. Microanalysis of the p-aminophenyl terminated polybutadiene polymer (Polymer IV) showed 0.22% N (Calc. 0.19% N).

In the two examples, the lithium-free N,N bis (trimethylsilyl) aminophenyl-terminated polymer (Polymer III) was isolated prior to the conversion of said polymer to an aminophenyl-terminated polymer (Polymer IV). It is understood that it is not necessary to first isolate the silyl-substituted polymer but the amino polymer may be obtained directly from the lithium polymer by acid-catalyzed hydrolysis — a well-known type of hydrolysis.

EXAMPLE III 1,3-Butadiene was polymerized with the p-lithio-N,N-bistrimethylsilyl aniline initiator (Compound I) prepared as in Example I. Instead of terminating the "live" polybutadienyl-lithium with methanol, as in Example I, a stoichiometric amount of dichlorodimethylsilane, coupling agent, was added to form the polybutadiene polymers (Polymer V) which are diterminated with the

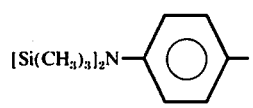

group.

TABLE II

| mm polymerlithium (Polymer II) | mm Coupling Agent | $\overline{M}_n$ (GPC) | $\overline{M}_w/\overline{M}_n$ (GPC) | % Coupled Polymer (GPC) (Polymer V) |
|---|---|---|---|---|
| 1.76 | 0.88 | 32,900 | 1.62 | 78 |
| 0.88 | 0.44 | 63,103 | 1.73 | 70 |

Since the efficiency of such coupling reactions is determined by experimental care and by the exactness of stoichiometry (D. N. Schulz et. al J. Polym. Sci. 12, 161 (1974) ), the yields of coupled polymer (Polymer V) in Table II should be viewed as illustrative rather than limiting.

EXAMPLE IV

Isoprene was polymerized with the p-lithio-N,N-bistrimethylsilyl aniline initiator (Compound I), according to the procedure used for polymerization of Butadiene, as in Example I. The "live" polyisoprenyllithium (Polymer II) was terminated with a stoichiometric amount of dichlorodimethylsilane, as coupling agent to form polyisoprene polymer (Polymer V), which is diterminated with the

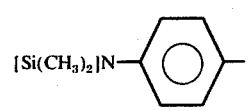

group. (Table III.)

TABLE III

| mm polymerlithium (Polymer II) | mm Coupling Agent | $M_n$ (GPC) | $M_w/M_n$ (GPC) | % Coupled Polymer (GPC) (Polymer V) |
|---|---|---|---|---|
| 6.18 | 3.4 | 40,420 | 1.73 | 76 |
| 16.0 | 8.8 | 34,002 | 1.55 | 70 |
| 4.84 | 2.66 | 60,466 | 1.46 | 90 |

Since the efficiency of coupling in such procedures is determined mainly by experimental care, and the exactness of stoichiometry (D. N. Schulz et al J. Polym. Sci. 12, 161 (1974) ), the yields of coupled polymer (Polymer V) in Table III should be reviewed as illustrative rather than limiting.

Conversion of the diterminated silylamine polymers (Polymer V) prepared in Examples III and IV are hydrolyzed according to the procedure in Example II to form diterminated amine polymers (Polymer VI).

We claim:

1. The method of producing a terminally functional lithium-termnated polymer which comprises (a) reacting a monomer from the class consisting of (1) conjugated dienes containing 4 to 8 carbon atoms, (2) mixtures of such conjugated dienes and (3) a mixture copolymer of such a conjugated diene and a vinyl monomer and (b) an initiator of the formula $(SiR_3)_2$—N—Ar—Li in which R is an alkyl group of 1 to 8 carbon atoms and Ar is from the class consisting of phenyl, tolyl, xylyl and naphthyl, (c) in a non-protic solvent at a temperature of −50 to 100° C.

2. The method of claim 1 in which the initiator has the formula $[Si(CH_3)_3]_2$—N—$C_6H_4$—Li.

3. The method of claim 1 in which the lithium-terminated polymer produced is hydrolyzed with an alcohol at substantially 25° C. and the lithium is replaced with hydrogen.

4. The method of claim 1 in which the lithium-terminated produced is hydrolyzed with an alcohol at substantially 25° C. and the lithium is replaced with hydrogen and is then further hydrolyzed with dilute acid at a temperature of substantially −50 to 100° C. and the $SiR_3$ groups are replaced by hydrogen.

5. The method of claim 1 in which the lithium-terminated polymer is reacted with $Cl_2$—Si—$R'_2$ in which R' is phenyl or an alkyl group of 1 to 8 carbon atoms.

6. The method of claim 1 in which the lithium-terminated polymer is reacted with $Cl_2$—Si—$R'_2$ in which R' is phenyl or an alkyl group of 1 to 8 carbon atoms, and the reaction product is hydrolyzed with a dilute acid at a temperature of substantially −50° to 100° C. and the $SiR_3$ groups are replaced with hydrogen.

7. The method of claim 1 in which the lithium-terminated polymer produced in hydrolyzed with an acid at a temperature of substantially −50°–100° C. and the $SiR_3$ and the lithium are replaced by hydrogen.

* * * * *

UNITED STATES PATENT OFFICE
CERTIFICATE OF CORRECTION

Patent No. 4,015,061　　　　　　　　　Dated March 29, 1977

Inventor(s)　　Donald Norman Schulz and Adel Farhan Halasa

It is certified that error appears in the above-identified patent and that said Letters Patent are hereby corrected as shown below:

Column 6, Table III, fourth column over, under the heading of $M_2/M_n$ (GPC) --- this heading should read $M_w/M_n$ (GPC)

Claim 1, line 22, termnated -- should be terminated

Claim 1, line 25-(3) a mixture copolymer-should read -- (3) a mixture <u>or</u> copolymer of . . .

*Signed and Sealed this*

Fourteenth Day of June 1977

[SEAL]

Attest:

RUTH C. MASON
*Attesting Officer*

C. MARSHALL DANN
*Commissioner of Patents and Trademarks*